(12) United States Patent
Dellert et al.

(10) Patent No.: US 9,886,220 B1
(45) Date of Patent: Feb. 6, 2018

(54) STORED IMAGE DATA FAILURE CORRECTION

(71) Applicant: Eastman Kodak Company, Rochester, NY (US)

(72) Inventors: David W. Dellert, Fairport, NY (US); David R. Brent, Walworth, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 2 days.

(21) Appl. No.: 15/227,998

(22) Filed: Aug. 4, 2016

(51) Int. Cl.
*G06F 3/12* (2006.01)
*H04N 1/00* (2006.01)
*H04N 1/32* (2006.01)

(52) U.S. Cl.
CPC ............ *G06F 3/121* (2013.01); *G06F 3/1234* (2013.01); *H04N 1/00007* (2013.01); *H04N 1/00037* (2013.01); *H04N 1/00084* (2013.01); *H04N 1/324* (2013.01); *H04N 2201/0082* (2013.01)

(58) Field of Classification Search
CPC .... G06F 3/121; G06F 3/1234; H04N 1/00084
See application file for complete search history.

(56) References Cited

U.S. PATENT DOCUMENTS

| | | | | |
|---|---|---|---|---|
| 5,966,504 A | * | 10/1999 | Sity | G06K 15/02 358/1.15 |
| 6,762,855 B1 | | 7/2004 | Goldberg et al. | |
| 8,064,084 B2 | * | 11/2011 | Khain | G06K 15/02 358/1.15 |
| 8,787,562 B2 | | 8/2014 | Carney et al. | |
| 2009/0248998 A1 | * | 10/2009 | Sato | G06F 3/0613 711/157 |
| 2013/0335763 A1 | * | 12/2013 | Mizutani | G06F 3/1298 358/1.13 |
| 2016/0088189 A1 | * | 3/2016 | Atsumi | H04N 1/41 358/1.17 |

\* cited by examiner

*Primary Examiner* — Benjamin O Dulaney
(74) *Attorney, Agent, or Firm* — Kevin E. Spaulding

(57) ABSTRACT

Image descriptions described using an image description language are provided for a plurality of images. Image bitmaps are determined by processing the image descriptions, each image bitmap including an array of image pixels. The image bitmaps are stored in an array of digital storage devices, with different portions of the image bitmaps being stored in different digital storage devices, where an allocation table is used to indicate where each portion is stored. When one of the digital storage devices fails, the allocation table is analyzed to determine which portions of the image bitmaps were stored in the failed digital storage device. The lost portions are re-rendered by processing corresponding portions of the image descriptions, and the re-rendered portions are stored in the array of digital storage devices.

10 Claims, 5 Drawing Sheets

STORED IMAGE DATA FAILURE CORRECTION

FIELD OF THE INVENTION

This invention pertains to the field of digital storage arrays and more particularly to a method for recovering image data that is lost when a digital storage device fails.

BACKGROUND OF THE INVENTION

Very high speed commercial digital presses print variable data at rates of thousands of pages per minute. Typically, the receiver media on which the data is printed is in the form of a web that is transported past stationary printheads. During transport, the web has considerable inertia and cannot be readily subjected to rapid changes in speed. It is desirable to continuously transport the web of receiver media at a constant speed, or with relatively slow speed adjustments.

The continuous transport of the web of receiver media also necessitates a continuous supply of data in the form of printable image data. This image data must be buffered so as to be available when it is needed, since any delay would result in blank pages unless the web of receiver media is stopped. Considerable time is required to fill a buffer with the printable image data, since the print job is initially supplied in an image description format which must be converted to image bitmaps. That conversion is typically in the form of raster image processing and is performed by one or more downstream processors. The processing speed that defines the sustained output speed of each of the downstream processors is generally limited by the content of the input descriptions, since the time to raster image process the image description for an individual print page tends to be highly data dependent. It is possible for the image description for a single print page to require a substantial amount of time to be converted to the printable image data output. Another limitation that affects the raster image processing is the supply of input data to the downstream processors. Variable data supplied by a secondary source can be subject to limitations of communication bandwidth or the processing capability of a host computer. With many print jobs, portions of the print job are simultaneously raster image processed and buffered before they are delivered to final raster image processor for assembly into a print engine ready format.

In high speed printing, a continuing problem is reliably supplying data at a rate sufficiently matched to the print engine. One approach to solving this problem is pausing the transport of the receiver media through the media transport path until sufficient data is available. This approach can be problematic, particularly for receiver in the form of a web being transported at high transport speeds. Another approach is to restrict how a print job is input. While this can be workable, it greatly encumbers the flexibility to make any last minute changes in the image data.

Commonly-assigned U.S. Pat. No. 6,762,855 (Goldberg et al.) discloses a system that uses buffer management logic to adjust transport speed on a per-document basis. Control buffers accumulate slack time left over from raster image processing non-complex documents and then allocate that slack time to complex documents to optimize average raster image processing time with the speed of the print engine.

The rate at which print data must be buffered necessitates high read and write data rates with the buffer memory in a memory storage unit. To overcome the inherent data transfer rate limitation of a memory storage unit, one method for achieving such data rates has been to use a plurality of memory storage units that can be concurrently accessed. However, the increase in the number of memory storage units brings with it an increased risk that one of the memory storage units will fail, bringing with it a risk of a total printing system failure.

There remains a need to provide the high data rates required for storing and accessing image data for high speed printing without producing an undue risk of a printing system failure.

SUMMARY OF THE INVENTION

The present invention represents a method for storing image data using an array of digital storage devices, including:

receiving image descriptions for a plurality of images, wherein the image descriptions are described using an image description language;

rendering the images by processing the image descriptions to create corresponding image bitmaps, each image bitmap including an array of image pixels;

storing the image bitmaps in the array of digital storage devices, wherein different portions of the image bitmaps are stored in different digital storage devices in the array of digital storage devices;

forming an allocation table indicating where each portion of the image bitmaps is stored in the array of digital storage devices;

detecting that one of the digital storage devices has failed;

analyzing the allocation table to determine which portions of the image bitmaps were stored in the failed digital storage device;

re-rendering the portions of the image bitmaps that were stored in the failed digital storage device by processing corresponding portions of the image descriptions; and storing the re-rendered portions of the image bitmaps in the array of digital storage devices.

This invention has the advantage that the rendered image bitmaps can be re-rendered more efficiently when a digital storage device storing a portion of the rendered image bitmaps fails.

BRIEF DESCRIPTION OF THE DRAWINGS

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

Figure 1:
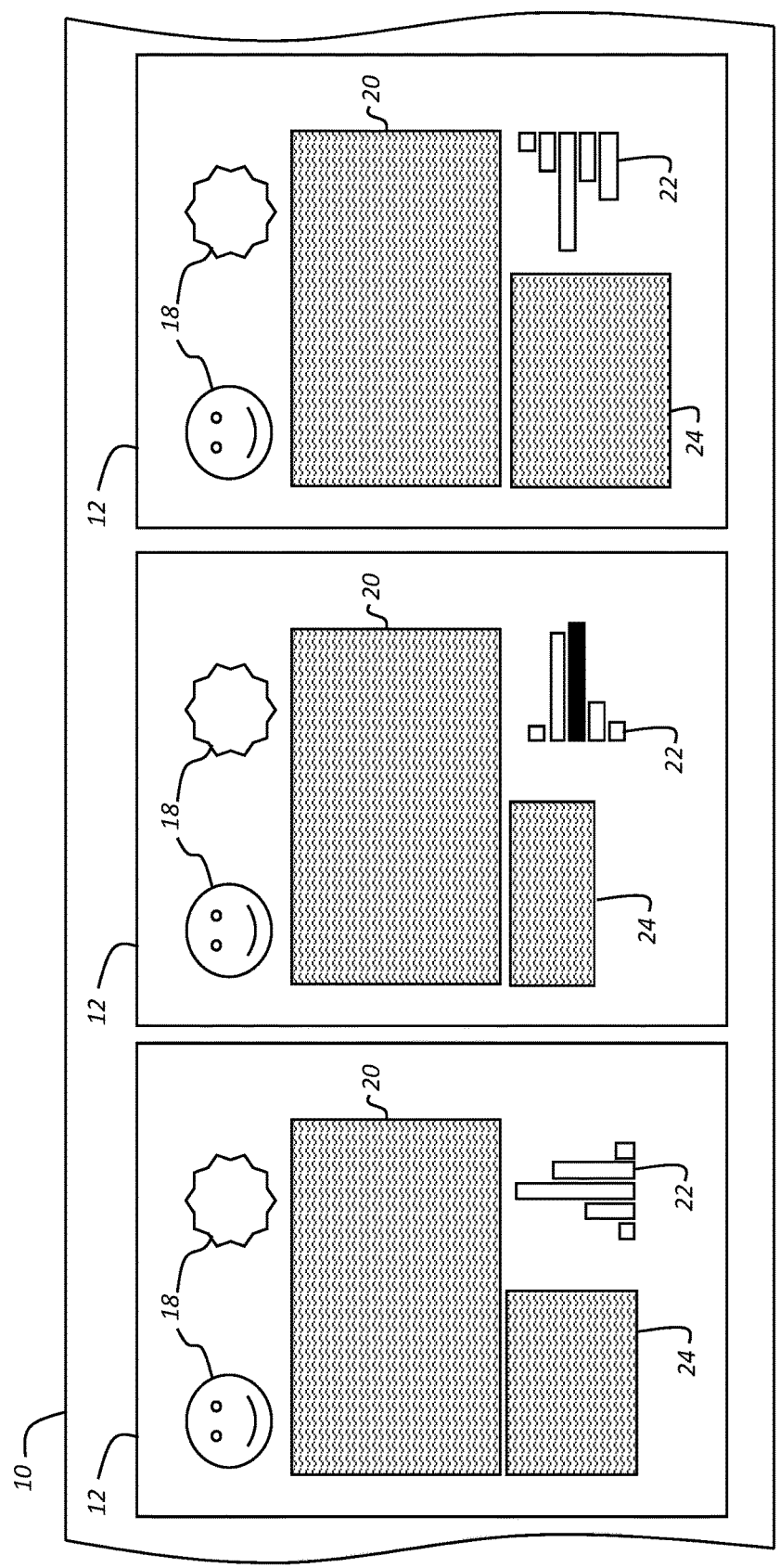
FIG. 1 illustrates a set of documents that make up a portion of a print job.

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

High speed variable printing systems are used in the commercial printing industry for a wide variety of printing applications such as printing short run catalogs and advertisements or transactional printed products such as bills and investment reports. It is common for the print jobs printed by high speed variable printing systems to be made up of a sequence of printed images. The print jobs are typically received in the form of a page description language (also referred to as an image description language), such as PostScript, PDF, AFP, IJPDS, and IPDS, which provide image descriptions of each image (i.e., each page).

Each image can be made up of a number of components, where the components can include continuous tone image components and vector format image components. Continuous tone image components are commonly used for photographic images, and are specified by an array of pixels having pixel values representing the intensity of each pixel, typically for a plurality of color planes. Common continuous tone image formats include JPEG, TIFF, GIF, BMP, and PNG. Vector format image components are specified by a geometrical description that can be scaled in size. It is commonly used for text and computer generated image components. Common vector format image formats include CGM, SVG, and PPT.

The sequence of images (i.e., pages) in a print job can include a mix of fixed data, which are common from one page to the next or from one group of pages (book or financial statement) to the next group of pages and variable data with changes from image to image. FIG. 1 illustrates a portion of an exemplary print job 10 including a series of individual images 12, such as financial statements. The images 12 include fixed graphics elements 18, such as logos, and fixed text elements 20 that are common to a plurality of images 12, together with variable figure elements 22 and variable text elements 24 that are specific to a particular image 12. In some cases, the formation of the images 12 in a print job 10 can involve data merger operations in which variable data (e.g., mailing addresses or financial transaction data) is extracted from a database or spreadsheet and the extracted variable data is inserted into a form or template that has fixed text elements 20 or fixed graphics elements 18. The template can also include variable graphic elements 22, such as a graph in which the content of the graphic element depends on variable data extracted from the database of spreadsheet.

Figure 2:
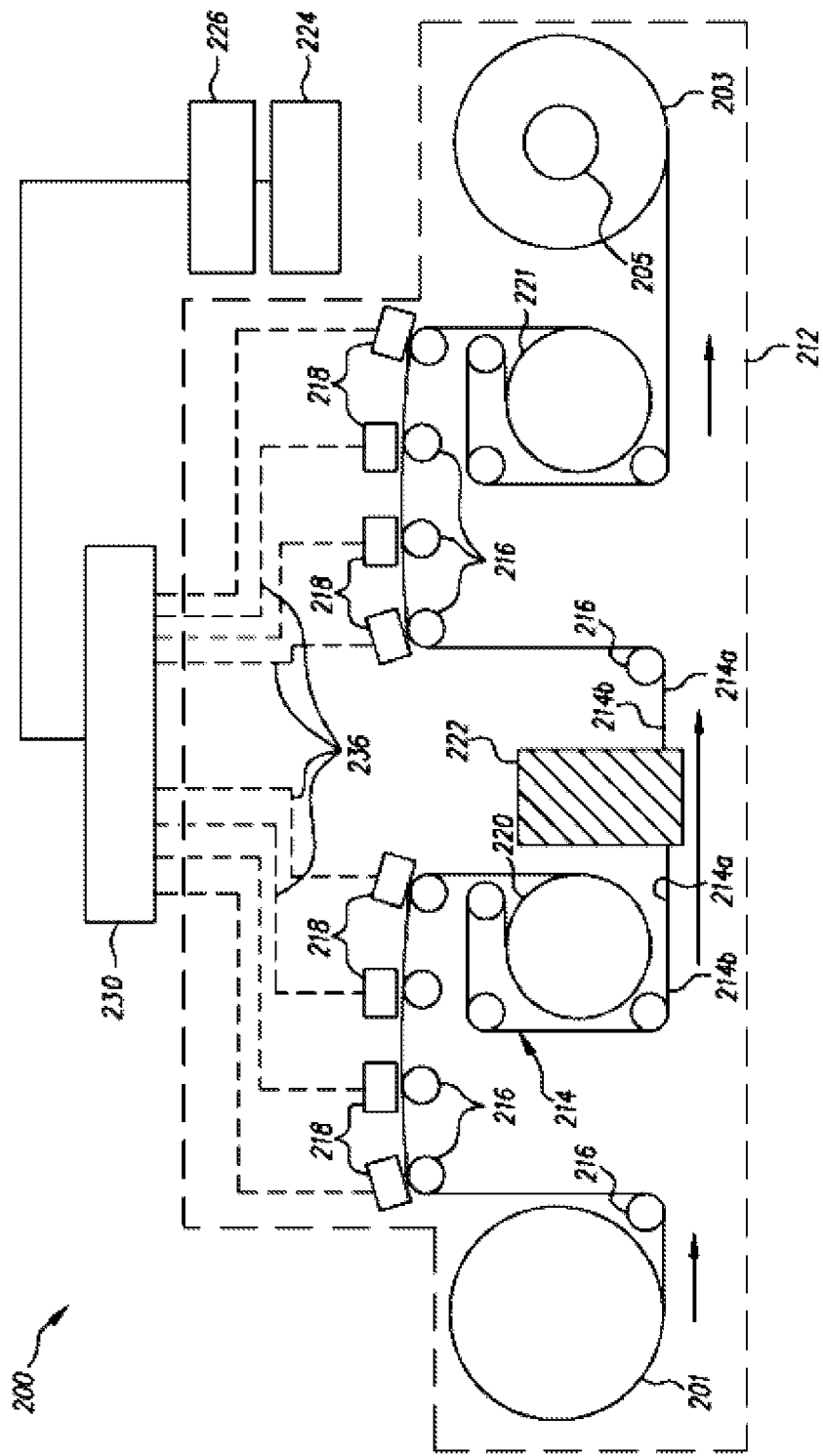
FIG. 2 is schematic side view of a high speed variable printing system.

Referring to FIG. 2, a high speed variable printing system 200 has a print engine 212 (also referred to herein as a printer) that prints on a receiver 214. The term "receiver" refers to media that accepts a printed image and is singular or plural, as indicated by context. In some embodiments, the receiver 214 can be multiple cut-sheets. In the particular embodiments discussed herein, the receiver 214 is in the form of a web that is an elongate, continuous piece. The use of a web typically allows the print engine 212 to attain higher speeds in transport, than other forms of receiver 214, such as cut-sheets. The receiver 214 is typically paper, but can also be any of a large number of other types of print media. For example, the receiver 214 can be thin or thick paper stock (coated or uncoated) or transparency stock. The receiver 214 has a first surface 214a and an opposed second surface 214b, one or both of which may be printed.

The receiver 214 in FIG. 2 is a web. The web is moved from a supply 201 to a take-up 203 by a transport system 205. Between the supply 201 and take-up 203, the web is threaded around a number of rollers 216 and past a sequence of printheads 218. In various embodiments, the printheads 218 can be continuous ink jet printheads, drop on demand ink jet printheads, electrophotographic toning stations (with or without transfer rollers or the like), or other equivalent units of a variable printing technology. For simplicity, in the discussion here, the printheads are generally discussed in terms of an embodiment, in which the printheads 218 are arranged in a sequence, and wherein each printhead 218 extends across the full width of the receiver 214. It will be understood that like considerations apply to other embodiments. For example, instead of using a full width printhead 218, a group of printheads 218 can be arranged in parallel (non-sequentially) to print a wider receiver 214.

The different printheads 218 each print image data for a printable image plane. A unit of image data that corresponds to an image plane is referred to herein as a "segment". The image planes are printed in registry with each other and, in combination, provide a printed page. The term "printed page" as used herein, thus, corresponds to the image printed on a single side of a piece of media. A piece of media can include printed pages on one or both surfaces. Each printed page can define an image area corresponding to the full dimensions as the sheet or can define a smaller area within those dimensions. A print job 10 (FIG. 1) can include a plurality of documents, where a document can include one or more pages (i.e., images 12) intended to be a unit for delivery to a single recipient; examples of multi-sheet documents include books, financial statements, and multiple sheet advertising material. Each image 12 can include a plurality of image planes represents a part of a document that is conveniently printed separately. For example, each image plane can use a different color of ink. With ink jet printheads, different image planes can be used to divide an image into different patterns of relatively spaced apart deposited drops. The resulting combined image is unchanged, but the different patterns improve drying, during the printing process.

Two sets of four printheads 218 are shown in FIG. 2. The invention is not limited as to a particular number of printheads 218 or sets of printheads 218. In FIG. 2, after passing one set of printheads 218, the partially printed image (not shown) on a first surface 214a of the receiver 214 is dried by a dryer 220 (e.g., by contact with a heated drum). The web is then flipped over by a turn station 222 before passing the second set of printheads 218 and the second side 214b is then dried by a second dryer 221.

In an exemplary configuration, a print job 10 including the image descriptions for multiple pages (images 12) is supplied from various image data sources by one or more input units 224. As will be described later, a data processing system 226 performs at least some of the operations necessary to convert the image descriptions to an image data format appropriate for the printheads 218. A main controller 230 is used to control the operation of the print engine 212, including sending image data to the printheads 218 over data paths 236 to print the image data provided by the data processing system 226.

In some configurations, the functions of a system manager and user interface (not separately illustrated) can also be provided by the data processing system 226. The system manager provides a communication hub, and system level administration and control features for other system components. The user interface provides setup and status information for the operation of the printing system 200. Via this user interface, the user can input user data pertaining to the physical characteristics of the printer, such as the relationships of the printheads, desired colors the system is capable of printing, and other information. Upon a power-up or a reset, the main controller 230 initializes the printing system 200 to a ready state.

As discussed further below, the job data can include a single print job 10 or a series of print jobs 10. The printing data represents the location, color, and intensity of each image pixel, and is in the form of one or more data files, which typically include or are accompanied by control commands. For example, data files can be supplied in a PDL (page description language) format, such as Postscript or IPDS or IJPDS. Printing data can be supplied from multiple sources, for combination during printing. Commonly-assigned U.S. Pat. No. 5,966,504 (Sity), entitled "Apparatus and method for printing," which is incorporated herein by reference, discloses an example of this type of procedure.

One input unit 224 is typically a locally connected host computer capable of supplying the printing data in a continuous stream. Software controls the flow of data from the host computer and via a host interface. The connection between the data processing system 226 and the host computer can be uni-directional or can be bi-directional to allow status information and the like to be presented on a user interface of the host computer. Suitable software for this purpose is well known to those of skill in the art. Other types of input units 224 can be used instead of, or in addition to, a host computer. For example, printing data can be supplied by a media reader using transferable media, such as CDs, DVDs, or by network connection to another computer. An image data source is a device that can provide digital data defining a version of the image. Such types of devices are numerous and include computers, microcontrollers, computer workstations, scanners, and digital cameras. Multiple devices can be interconnected on a network. These image data sources are at the front end and generally include an application program that is used to create or find an image to output.

Figure 3:
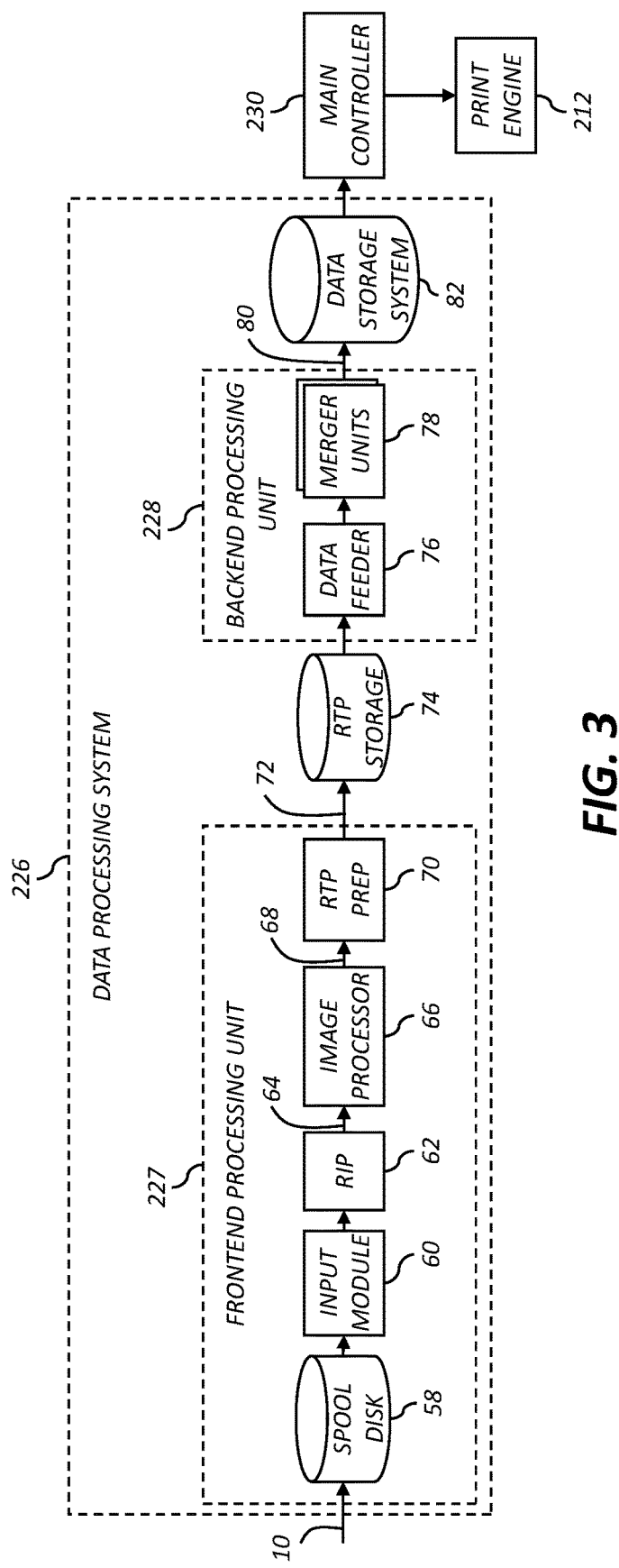
FIG. 3 is a block diagram of a data station for supplying print data to the printheads of a high speed variable printing system in accordance with the invention.

FIG. 3 illustrates block diagram of an embodiment of a data processing system 226 for supplying print data to the printheads 218 of the printing system 200. In the illustrated configuration, the data processing system 226 includes a frontend processing unit 227 and a backend processing unit 228. Optionally, the processing performed by the frontend processing unit 227 and the backend processing unit 228 can be combined into a single processing unit. The frontend processing unit 227 receives incoming print jobs 10, which include image descriptions for a plurality of images 12 (FIG. 1). The image descriptions are typically provided using a page description language PDL. The output of the frontend processing unit 227 is blocks of image data in a ready to print (RTP) format (hereafter referred to as RTP elements 72) for elements in the images. The RTP elements 72 are stored in an RTP storage 74 for retrieval by the backend processing unit 228.

The processing of the frontend processing unit 227 can include buffering the received print jobs 10 in a spool disk 58. An input module 60 receives the print jobs and queues the image descriptions for processing by the raster image processor (RIP) 62. The RIP 62 processes the various fixed and variable continuous tone and vector format image components that make up an image 12, and creates bitmapped image elements 64 for each color plane. As discussed in the aforementioned U.S. Pat. No. 5,966,504 (Sity), it is only necessary to create bitmapped image elements 64 once for each of the fixed image components (e.g., fixed graphics elements 18 and fixed text elements 20 in FIG. 1) rather than recreate them for each page that in which those fixed image components exist.

The bitmapped image elements 64 are modified by an image processor 66 to provide modified bitmapped image elements 68. The bitmapped image processor 64 can perform various image processing modifications including anti-aliasing and trapping. An RTP preparation module 70 converts the modified bitmapped image elements 68 into ready-to-print (RTP) format, the converted image elements being referred to as RTP elements 72. The RTP elements 72 are stored in RTP storage 74.

The RTP format is a proprietary format of the Eastman Kodak Company for ripped jobs (sometimes referred to as "RIPed jobs"), which contains both fixed and variable elements in a compressed format. The RTP format is an element-based format in which rendered reusable and non-reusable elements are represented as separate RTP elements 72. According to this format, a ripped job includes a set of RTP pages and each RTP page refers to a set of RTP elements 72. The ripping of a fixed element is performed only once per job, thus saving processing time and a single copy is stored per job, thus saving storage space. This is a significant advantage in common VDP (variable data printing) jobs, where many pages share the same master background and the unique variable information is only a small part of the page. Each RTP element 72 can be stored as a compressed raster-element. The RTP elements 72 are prepared accordingly to accommodate the specifics of the fusion cards, also called merger cards, and the characteristics of the print engine 212.

The backend processing unit 228 assembles the RTP elements 72 into image bitmaps 80 and stores them in page buffers in a data storage system 82 for later printing by the printheads 218 of the print engine 212. The backend processing unit 228 includes a data feeder 76, which loads the RTP data, and schedules work for the one or more merger units 78, initiating merge operations and monitoring the merge process carried out by the merger units 78.

The merger units 78 typically include processing boards (sometimes referred to as "merger cards" or "merger boards") that are configured to merge and assemble the RTP elements 72 into a continuous-tone (i.e., "contone") image bitmaps. The continuous-tone image bitmaps are further processed by the merger units 78 according to engine specifications to provide image bitmaps 80, wherein each image bitmap 80 includes an array of image pixels appropriate for printing. This processing can include linearizing the tone scale, applying various look-up table (LUT) transformations, applying halftone screening to the continuous-tone image bitmaps to produce halftoned image bitmaps, and compressing the resulting halftoned image bitmaps. Though the merging process performed by the merger units 78 can be implemented either in software or in hardware, typically the merger is implemented in hardware in order to meet the speed requirements of the printer engine speed. The image bitmaps 80 are stored in page buffers in a data storage system 82 until they are transferred to the print engine 212 for printing by the printheads 218 of the print engine 212.

According to the performance requirements of the printing system 200, the data processing system 226 can include a single merger unit 78 or multiple merger units 78. In a data processing system 226 equipped with a single merger unit 78, the merger unit 78 will handle all the process colors (e.g. Cyan (C), Magenta (M), Yellow (Y) and Black (K)). In a data processing system 226 equipped with multiple merger units 78, each merger unit 78 can be responsible for one or more process colors. For example, in the case of two merger units 78, one merger unit 78 can handle the C and M color channels whereas the other merger unit 78 can handle the Y and K color channels. The output of the one or more merger units 78 is passed to the data storage system 82, which can typically hold the image bitmaps 80 for up to several hundred pages of the print job 10.

It must be appreciated that both the frontend processing unit 227 and the backend processing unit 228 can involve distribution of the processing operations to multiple parallel processors as discussed in commonly-assigned U.S. Pat. No. 8,064,084 (Khain), which is incorporated herein by reference.

Figure 4:
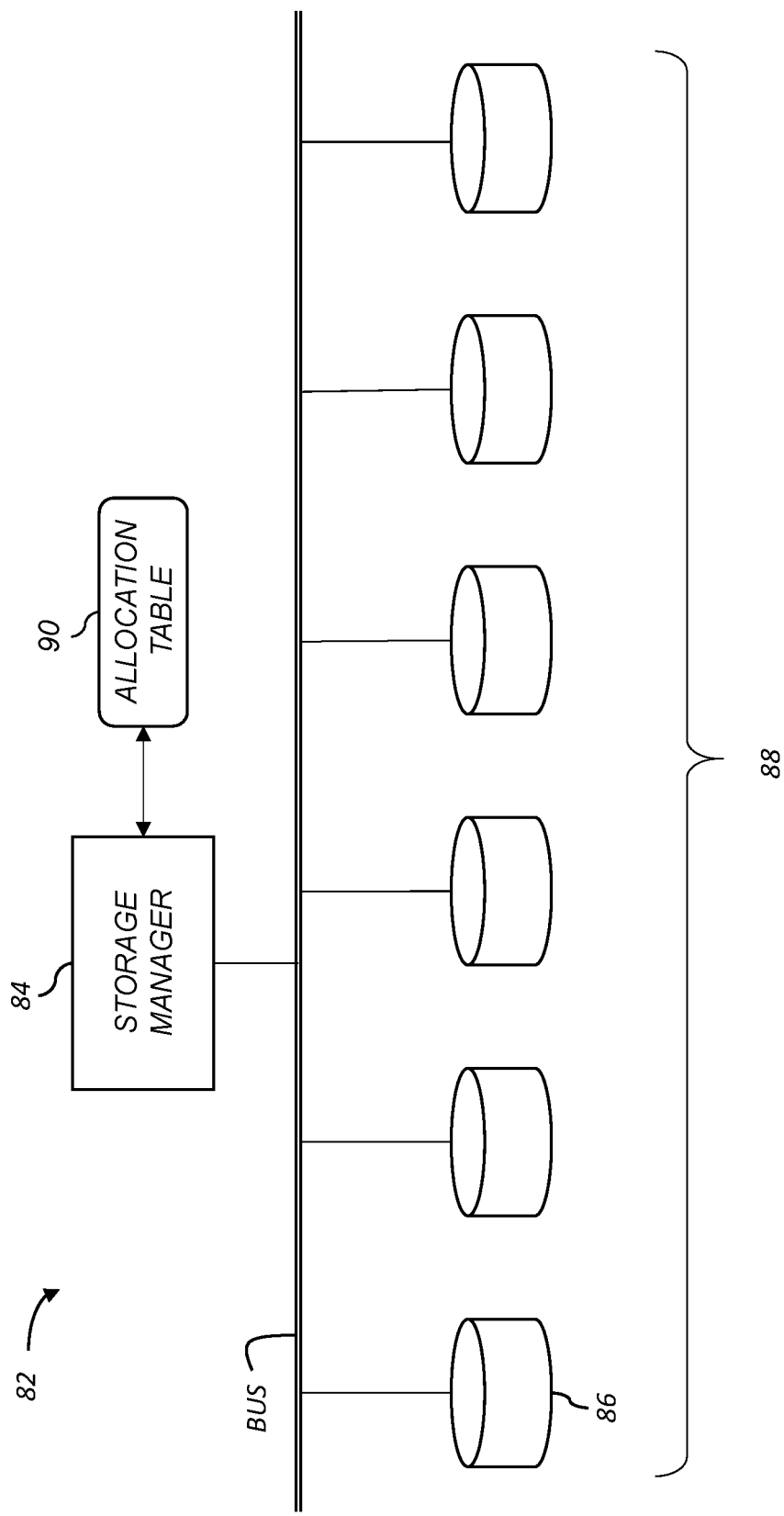
FIG. 4 illustrates an embodiment of a digital storage system having an array of digital storage devices.

To handle the storage and data rate requirements associated with high speed printing, the data storage system 82 typically includes a storage array 88 of digital storage devices 86 as illustrated in FIG. 4. The digital storage devices 86 can use any appropriate form of digital storage. For example, in an exemplary embodiment, the digital storage devices 86 can include magnetic storage disks, or solid state drives, or combinations thereof.

As the image bitmaps 80 for the different color planes are created by the one or more merger units 78, a storage manager 84 controls where the different image bitmaps 80 are stored on different of the digital storage devices 86. Typically, the image bitmaps 80 are broken into a set of image bitmap portions, with each image bitmap portion being stored on one of the digital storage devices 86. To enable the image bitmaps 80 to be retrieved in the proper sequence, the storage manager 84 uses an allocation table 90 to indicate where each image bitmap portion of each image bitmap 80 is stored in the storage array 88 of digital storage devices 86. An image bitmap portion stored in the data storage system 82 can correspond to an entire image bitmap 80 for an image 12 (FIG. 1), or to a subset of an image bitmap 80.

By way of example, a particular print job 10, may have M pages (i.e., images 12), each having four color planes; cyan, magenta, yellow, and black (CMYK). The data processing system 226 (FIG. 3) can determine image bitmaps 80 for each color plane of each page. Each of the image bitmaps 80 can then be subdivided into three portions (which can, for example, be labeled as segment I, segment II, and segment III). As each of the image bitmap portions are stored in one of the digital storage devices 86, the allocation table 90 is updated to indicate where that image bitmap portion is stored. For example, the image bitmap portion can be identified by a print job reference number, a page reference number, a color plane reference number and a segment reference number, and the location that the image bitmap portion is stored can be identified by a digital storage device reference number, a sector reference number, and a track reference number.

As the print job 10 is being printed, the storage manager 84 refers to the allocation table 90 to enable the various image bitmap portions of each image bitmap 80 for each image 12 in the print job 10 to be retrieved from the storage array 88 of digital storage devices 86 in the proper order to enable the segments of the various color planes to be properly correlated to each other for each image 12 in the print job 10.

It is not uncommon for one of the digital storage devices 86 to fail or become corrupted, losing some or all of the data stored on it. If one of the digital storage devices 86 storing a portion of the image data for a print job 10 fails during the printing of the print job 10, it is not possible to retrieve those portions of the image bitmap data that were stored on that digital storage device 86. In prior art systems, detection of such a digital storage device failure would cause a fatal printing system error, aborting the printing of the print job 10. The printing system would then need to re-render the unprinted portions of the print job 10 after a system restart. This leads to a significant loss in productivity.

The present invention overcomes this problem by recognizing that only those portions of the image bitmaps 80 that were saved on the defective digital storage device 86 of the data storage system 82 have been lost. The portions of the image bitmaps that were stored on the other digital storage devices are still available for printing. It this therefore not necessary to re-render the entire print job 10, but rather it is only necessary to re-render those portions of the print job 10 that correspond to the portions of the image bitmaps 80 that were stored on the defective digital storage device 86 that still needed to be printed.

Figure 5:
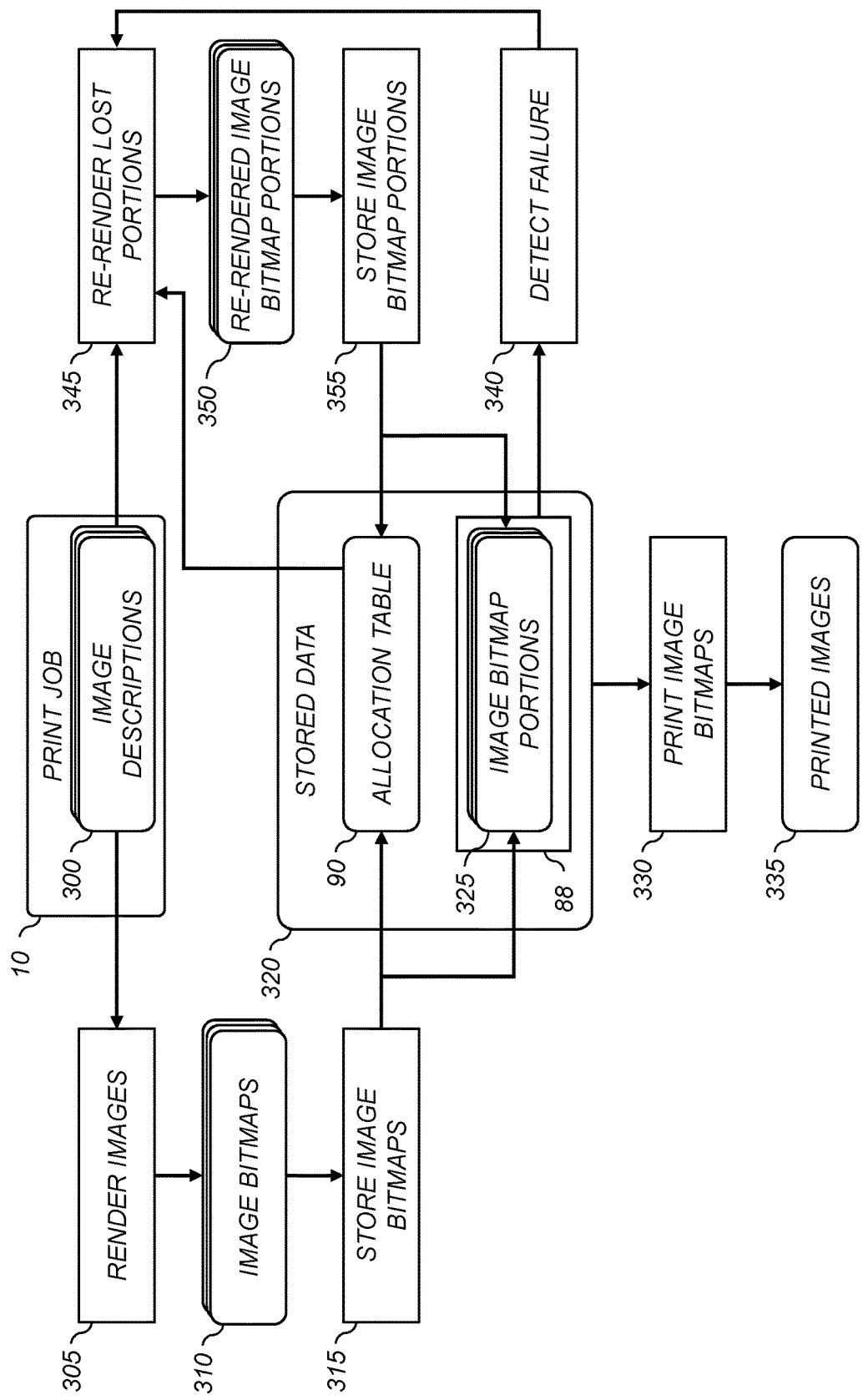
FIG. 5 is a flow chart illustrating a method for storing image data using an array of digital storage devices in accordance with the present invention.

FIG. 5 shows a flow chart illustrating a method for storing image data using a storage array 88 (FIG. 6) in accordance with the present invention. A print job 10 includes image descriptions 300 for a plurality of images. A render images step 305 processes the image descriptions 300 to form corresponding image bitmaps 310 using a process such as that discussed relative to FIG. 3. Each image bitmap 310 includes an array of image pixels adapted to be printed on the printing system 200 (FIG. 2).

A store image bitmaps step 315 is then used to store the image bitmaps 310 in a storage array 88 of digital storage devices 86 (FIG. 4). This involves dividing the image bitmaps 310 up into image bitmap portions 325, wherein different image bitmap portions 325 are stored in different digital storage devices 86 in the storage array 88. In an exemplary configuration, the image bitmaps 310 are divided into image bitmap portions 325 that can be stored in memory blocks having a predefined size. The optimal size is determined by the overall transfer rate including access time of the digital storage device. In an exemplary embodiment, the smallest supported block size that achieves 95%+ of the digital storage device peak bandwidth is used.

An allocation table 90 is formed indicating where each image bitmap portion 325 is stored in the storage array 88. Together, the image bitmap portions 325 and the allocation table 90 can be referred to as stored data 320 pertaining to the print job 10. In some embodiments, the stored data 320 can also include other information such as metadata pertaining to how and when the print job 10 is to be printed.

In some embodiments, the image bitmap portions 325 can be compressed before storage in the storage array 88 (e.g., in a compressed image format such as JPEG or TIFF). In some cases, the image bitmaps 310 can be compressed before they are divided into different image bitmap portions 325 (e.g., each image bitmap portion 325 can include a certain number of bytes of compressed image data). In other cases, the image bitmaps 310 can be divided into different image bitmap portions 325 and each of the image bitmap portions 325 can be compressed individually.

In normal operation, a print image bitmaps step 330 is used to print the print job 10 by accessing the stored image bitmap portions 325 in the appropriate order and providing them to the print engine 212 of the printing system 200 (FIG. 2), producing printed images 335.

However, in some cases, one of the digital storage devices 86 in the storage array 88 may fail entirely, or a portion of the stored image bitmap portions 325 may become corrupted or unreadable due to a partial failure. In this case, a detect failure step 340 detects that there has been a failure. Errors can be detected by the digital storage device controller.

Upon detecting a failure of one of the digital storage devices 86 in the storage array 88, a re-render lost portions step 345 is used to re-render the portions of the image bitmaps 310 that were stored in the failed digital storage device 86. To enable this, the allocation table 90 is analyzed (e.g., by the storage manager 84 (FIG. 4)) to determine which image bitmap portions 325 were stored in the failed digital storage device 86. Once the lost portions have been identified, the re-render lost portions step 345 re-renders those portions to provide re-rendered image bitmap portions 350 by processing corresponding portions of the image descriptions 300.

In an exemplary configuration, the re-rendered image bitmap portions 350 are assembled from RTP elements 72, which had been stored on the RTP storage 74 at the time those portions of the image bitmaps 310 were originally rendered as was discussed earlier with respect to FIG. 3. At least some of the RTP elements 72 needed to produce the re-rendered image bitmap portions 350 may still be stored in the RTP storage 74. In such cases, re-rendering the image bitmap portions 325 that were stored in the failed digital storage device 86 only requires using the RIP 62 of the frontend processing unit 227 to regenerate from the original image descriptions 300 any of the required RTP elements 72 that are no longer stored in the RTP storage 74. The data feeder 76 and the merger units 78 of the backend processing unit 228 can then be used to assemble the re-rendered image bitmap portions 350 from the RTP elements 72. It should be noted that the RTP elements 72 are representations of portions of the original image descriptions 300. Therefore, even if none of the required RTP elements 72 need to be regenerated, within the context of the present disclosure, determining the re-rendered image bitmap portions 350 from the stored RTP elements 72 is considered to be equivalent to determining the re-rendered image bitmap portions 350 from the image descriptions 300.

In some cases, it may be necessary to re-render a larger portion of the image bitmaps 310 than that corresponding to the lost image bitmap portions 325. For example, if the image bitmaps 310 are compressed before they are divided into image bitmap portions 325, it may be necessary to re-render some or all of the full image bitmap 310 in order to recreate the lost image bitmap portion(s) 325. In an exemplary arrangement, regions of the image bitmaps 310 that are required to recreate the compressed image bitmap portions 325 that were stored in the failed digital storage device 86 are determined. The required regions of the image bitmaps 310 are then re-rendered, and re-compressed. The compressed image bitmap portions 325 that were stored in the failed digital storage device are then extracted from the compressed image bitmap regions.

A store image bitmap portions step 355 is then used to store the re-rendered image bitmap portions 350 on one or more of the remaining non-failed digital storage devices 86 in the storage array 88. The allocation table 90 is also updated by the storage manager 84 (FIG. 4) in accordance with the locations that the re-rendered image bitmap portions 350 were stored. The image bitmaps 310 including the re-rendered image bitmap portions 350 can then be printed using the print image bitmaps step 330 to provide the printed images 335.

In some embodiments, the analysis to determine which image bitmap portions 325 were stored in the failed digital storage device 86 includes a determination of which images 12 in the print job 10 include image bitmap portions 325 that were stored on the failed digital storage device 86. Only those image bitmap portions 325 corresponding to unprinted images 12 need to be re-rendered. While the re-rendered image bitmap portions 350 are being assembled, the printing system 200 can continue to print any images 12 that do not include any image bitmap portions 325 that were stored on the failed digital display device 86. However, while the printing system 200 can continue to print the images 12 that weren't affected by the failed digital storage device 86, the number of images 12 that are available to be printed is reduced accordingly. As taught in commonly-assigned U.S. Pat. No. 6,762,855 (Goldberg, et al.), entitled "Variable speed printing system," the main controller 230 can initiate a reduction in print speed in response to the reduced number of printable images 12 stored in the data storage system 82 to reduce the risk that the print engine 212 will deplete the data storage system 82 of printable images 12.

In some embodiments a storage manager 84 allocates the image bitmap portions 325 among the digital storage devices 86 of the storage array 88 in such a way as to reduce the risk that the loss of a single digital storage device 86 will deplete the data storage system 82 of printable images 12. In one such embodiment, there are M digital storage devices 86 in the storage array 88 and there are N color planes to be printed, where M>N. The rendered image bitmaps 310 for the N different color planes for a sequences of document pages 12 can be uniformly allocated between the M different digital storage devices. Such an allocation can ensure that at least of fraction (M−N)/M of the rendered images 12 in the data storage system 82 will not include image bitmap portions 325 on any single digital storage device 86 that might could fail.

The invention has been described in the context of a method for storing image bitmaps 310 using a storage array 88 of digital storage devices 86, and for re-rendering and re-storing those image bitmap portions 325 that were stored in a digital storage device 86 that was found to have failed. The invention is also applicable to the storing of other types image data in storage arrays 88 of digital storage devices 86. For example, the method of the present invention can also be applied to the RTP elements 72 stored in the RTP storage 74 (see FIG. 3).

As applied to storage of the image bitmaps of the RTP elements 72, the inventive method includes receiving image descriptions 300 for a plurality of images 12 in a print job 10, wherein the image descriptions 300 are described using an image description language. The image descriptions 300 are processed to render image bitmaps in the form of RTP elements 72 that each correspond to different elements of the images 12, wherein the RTP elements 72 each include an array of image pixels. The image bitmaps of the RTP elements 72 are stored in the RTP storage 74 which includes a storage array 88 of digital storage devices 86, wherein different RTP elements 72 are stored in different digital storage devices 86. A storage manager 84 forms an allocation table 90 which indicates where each RTP element 72 is stored in the storage array 99 of digital storage devices 86.

If the system detects that one of the digital storage devices 86 has failed, a recovery process is initiated that includes analyzing the allocation table 90 to determine which RTP elements 72 were stored in the failed digital storage device 86. The frontend processing unit 227 is then used to re-render the RTP elements 72 that had been stored in the failed digital storage device 86 by processing corresponding portions of the image descriptions 300. The re-rendered RTP elements 72 are then stored on the remaining non-failed digital storage devices 86 in the storage array 88 and the allocation table 90 is updated accordingly, while the frontend processing unit 227 is re-rendering and re-storing the RTP elements 72 that had been stored in the failed digital storage device 86, the print engine can continue to print images 12 whose image bitmaps 310 had already been determined and stored in the data storage system 82.

In some embodiments of the invention, the step of determining which RTP elements 72 were stored in the failed digital storage device 86 can include an analysis of the images 12 in the queue to be processed by the backend processing unit 228 to determine which of these images 12 do not include any RTP elements 72 that were stored on the failed digital storage device. The backend processing unit 228 can continue to create image bitmaps 310 for such images 12 until the frontend processing unit 227 can re-render and re-store the RTP elements 72 that had been lost when the digital storage device 86 failed.

The invented method can comprise a computer program that can be stored in one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 10 print job
12 image
18 fixed graphics element
20 fixed text element
22 variable graphics element
24 variable text element
58 spool disk
60 input module
62 raster image processor (RIP)
64 bitmapped image elements
66 image processor
68 modified bitmapped image elements
70 RTP preparation module
72 RTP elements
74 RTP storage
76 data feeder
78 merger units
80 image bitmaps
82 data storage system
84 storage manager
86 digital storage device
88 storage array
90 allocation table
200 printing system
201 supply
203 take-up
205 transport system
212 print engine
214 receiver
214a first surface
214b second surface
216 roller
218 printhead
220 dryer
221 dryer
222 turn station
224 input unit
226 data processing system
227 frontend processing unit
228 backend processing unit
230 main controller
236 data path
300 image descriptions
305 render images step
310 image bitmaps
315 store image bitmaps step
320 stored data
325 image bitmap portions
330 print image bitmaps step
335 printed images
340 detect failure step
345 re-render lost portions step
350 image bitmap portions step
355 store image bitmap portions step

The invention claimed is:

1. A method for storing image data using an array of digital storage devices, comprising:

receiving image descriptions for a plurality of images, wherein the image descriptions are described using an image description language;

rendering the images by processing the image descriptions to create corresponding image bitmaps, each image bitmap including an array of image pixels;

storing the image bitmaps in the array of digital storage devices, wherein different portions of the image bitmaps are stored in different digital storage devices in the array of digital storage devices;

forming an allocation table indicating where each portion of the image bitmaps is stored in the array of digital storage devices;

detecting that one of the digital storage devices has failed;

analyzing the allocation table to determine which portions of the image bitmaps were stored in the failed digital storage device;

re-rendering the portions of the image bitmaps that were stored in the failed digital storage device by processing corresponding portions of the image descriptions; and storing the re-rendered portions of the image bitmaps in the array of digital storage devices.

2. The method of claim 1, wherein the image description language is PostScript, PDF, AFP, IJPDS or IPDS.

3. The method of claim 1, wherein processing the image descriptions to create the corresponding image bitmaps includes using a raster image processor to create image bitmaps from the image description.

4. The method of claim 3, wherein the raster image processor creates ready-to-print image bitmaps for blocks of image data corresponding to individual elements of the images, and wherein one or more merger units are used to assemble the ready-to-print image bitmaps into complete image bitmaps for the plurality of images.

5. The method of claim 4, wherein re-rendering the portions of the image bitmaps that were stored in the failed digital storage device includes:
   determining which ready-to-print image bitmaps are required to re-render the portions of the image bitmaps that were stored in the failed digital storage device;
   determining which of the required ready-to-print image bitmaps are no longer available;
   using the raster image processor to recreate the required ready-to-print image bitmaps that are no longer available; and
   re-rendering the portions of the image bitmaps that were stored in the failed digital storage device by assembling the required ready-to-print image bitmaps.

6. The method of claim 1, further including compressing the image bitmaps before they are stored in the array of digital storage devices.

7. The method of claim 6, wherein the image bitmaps are compressed to form compressed image bitmaps, and wherein the compressed image bitmaps are divided into the different portions that are stored in different digital storage devices in the array of digital storage devices.

8. The method of claim 7, wherein re-rendering the portions of the image bitmaps that were stored in the failed digital storage device includes:
   determining regions of the image bitmaps that are required to recreate the portions of the compressed image bitmaps that were stored in the failed digital storage device;
   re-rendering the required regions of the image bitmaps;
   compressing the required regions of the image bitmaps; and
   extracting the portions of the compressed image bitmaps that were stored in the failed digital storage device.

9. The method of claim 1, wherein the image bitmaps are divided into image bitmap portions that can be stored in memory blocks having a predefined size.

10. The method of claim 1, further including printing the image bitmaps including the re-rendered portions on a digital printing system by accessing the image bitmaps stored in the array of digital storage devices.

* * * * *